US012621050B2

(12) United States Patent
Chakraborty et al.

(10) Patent No.: US 12,621,050 B2
(45) Date of Patent: May 5, 2026

(54) SATELLITES HAVING BROADBAND AND NARROWBAND COMMUNICATION HARDWARE

(71) Applicant: Microsoft Technology Licensing, LLC, Redmond, WA (US)

(72) Inventors: Tusher Chakraborty, Bellevue, WA (US); Ranveer Chandra, Kirkland, WA (US); Vaibhav Singh, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 357 days.

(21) Appl. No.: 18/305,580

(22) Filed: Apr. 24, 2023

(65) Prior Publication Data

US 2024/0356634 A1     Oct. 24, 2024

(51) Int. Cl.
*H04B 7/185*      (2006.01)
*H04W 36/08*      (2009.01)

(52) U.S. Cl.
CPC ..... *H04B 7/18584* (2013.01); *H04B 7/18515* (2013.01); *H04W 36/083* (2023.05)

(58) Field of Classification Search
CPC ........... H04B 7/18584; H04B 7/18515; H04W 36/083
See application file for complete search history.

(56) References Cited

U.S. PATENT DOCUMENTS 5,642,358 A      6/1997  Dent
10,178,449 B1 *  1/2019  Struhsaker ............... H04Q 9/00

10,419,948 B1 *    9/2019  Labadie ................. H01Q 3/005
2017/0290012 A1 *  10/2017  Hreha ..................... H01Q 21/24
2024/0250899 A1 *  7/2024  Ravishankar .......... H04B 7/195

FOREIGN PATENT DOCUMENTS

| CN | 108923841 A | * 11/2018 | ........... H04B 7/1851 |
| CN | 114401033 A | * 4/2022 | ............ H04W 88/02 |
| CN | 115173933 A | * 10/2022 | ......... H04B 7/18513 |
| CN | 115173934 A | * 10/2022 | ........... H04B 7/0408 |

OTHER PUBLICATIONS

Xiao et al., Antenna Array Enabled Space/Air/Ground Communications and Networking for 6G, IEEE Journal on Selected Areas in Communications, Oct. 2022, vol. 40, Issue 10, pp. 2773-2804 (Year: 2022).*
Cui, et al., "Space-air-ground integrated network (SAGIN) for 6G: Requirements, architecture and challenges", China Communications, vol. 19, Issue No. 2, Feb. 28, 2022, pp. 90-108.
International Search Report and Written Opinion received for PCT Application No. PCT/US2024/023507, Aug. 28, 2024, 10 pages.

* cited by examiner

*Primary Examiner* — Charles N Appiah
(74) *Attorney, Agent, or Firm* — Alleman Hall LLP

(57)                ABSTRACT

Examples are provided that relate to satellites utilizing both a narrowband communication channel and a broadband communication channel. One example provides a satellite comprising narrowband communication hardware configured to communicate on a control plane over a narrowband communication channel using an omnidirectional antenna. The satellite further comprises broadband communication hardware configured to communicate on a data plane over a broadband communication channel using a beamforming antenna.

19 Claims, 12 Drawing Sheets

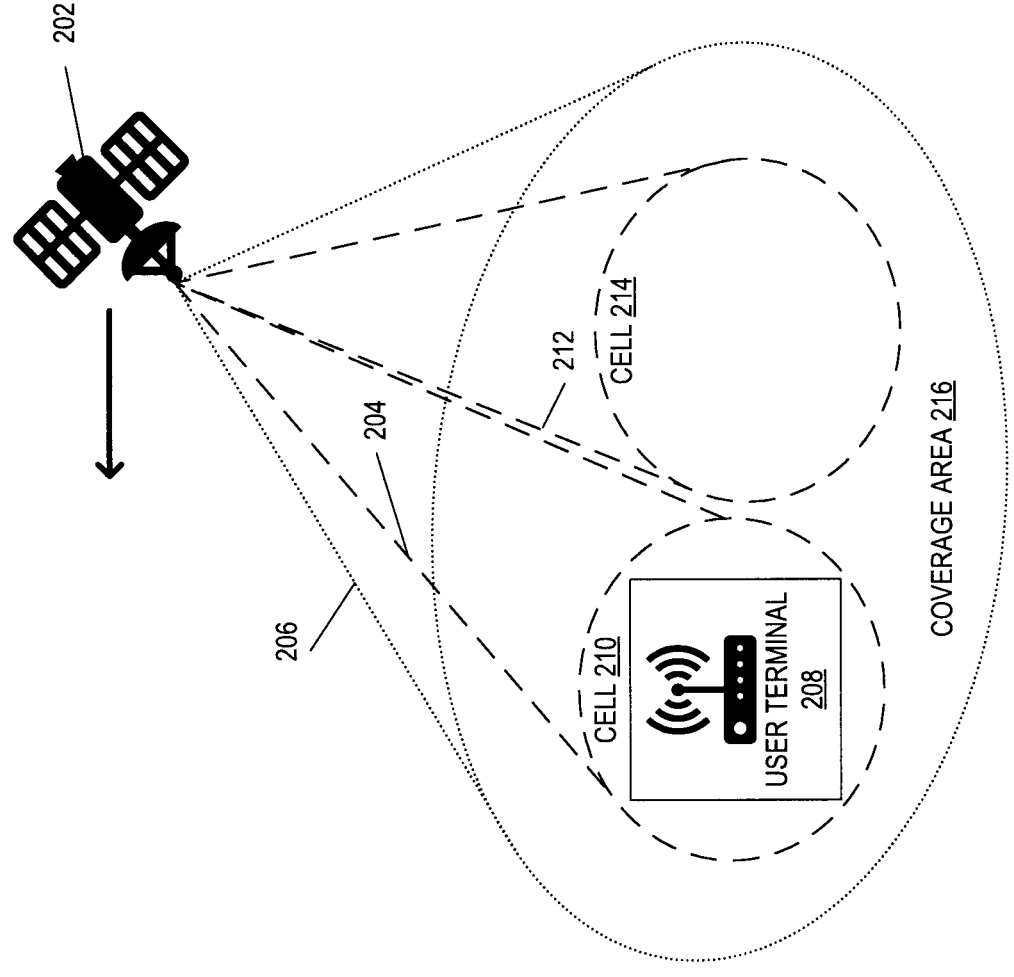
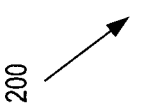
FIG. 2A

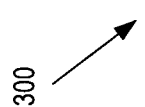
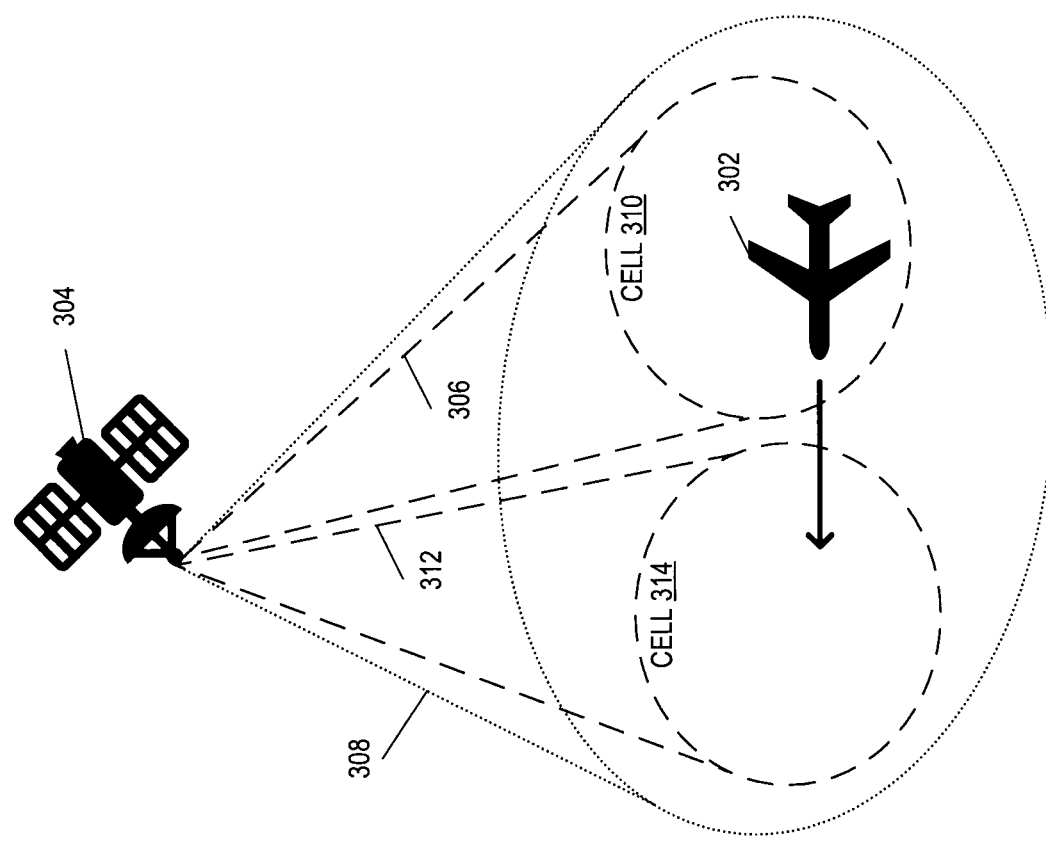
FIG. 3A

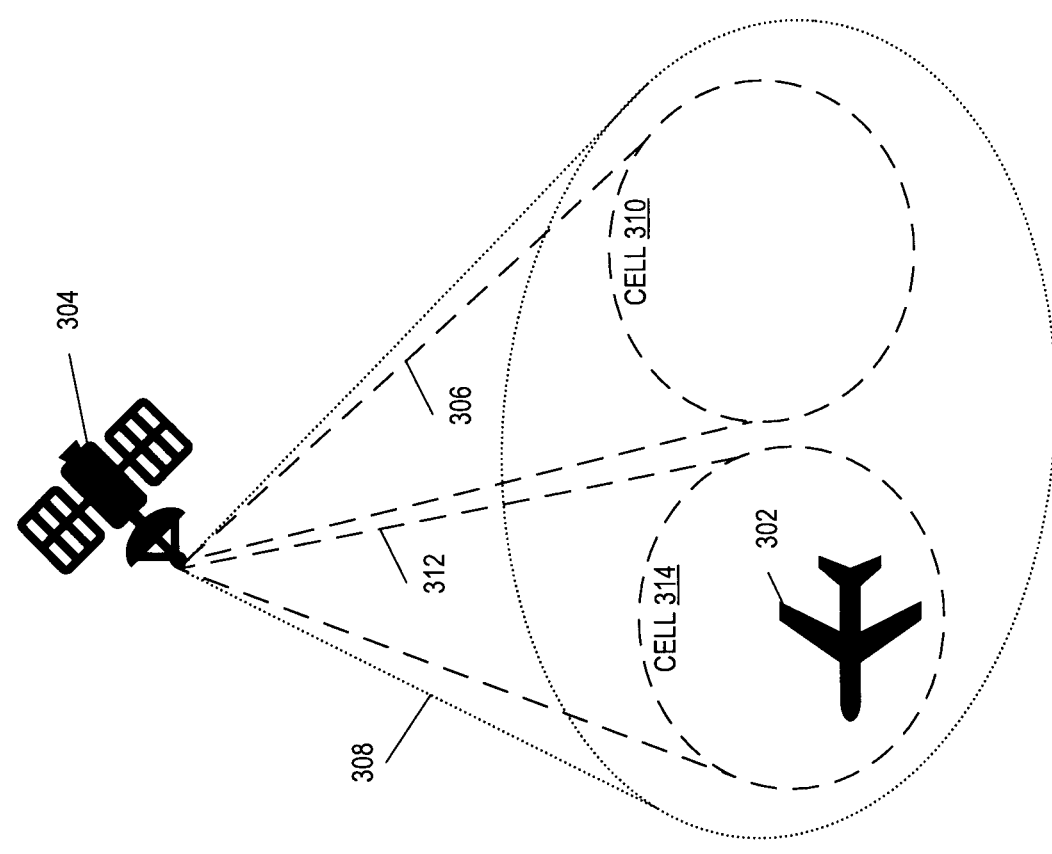
FIG. 3B

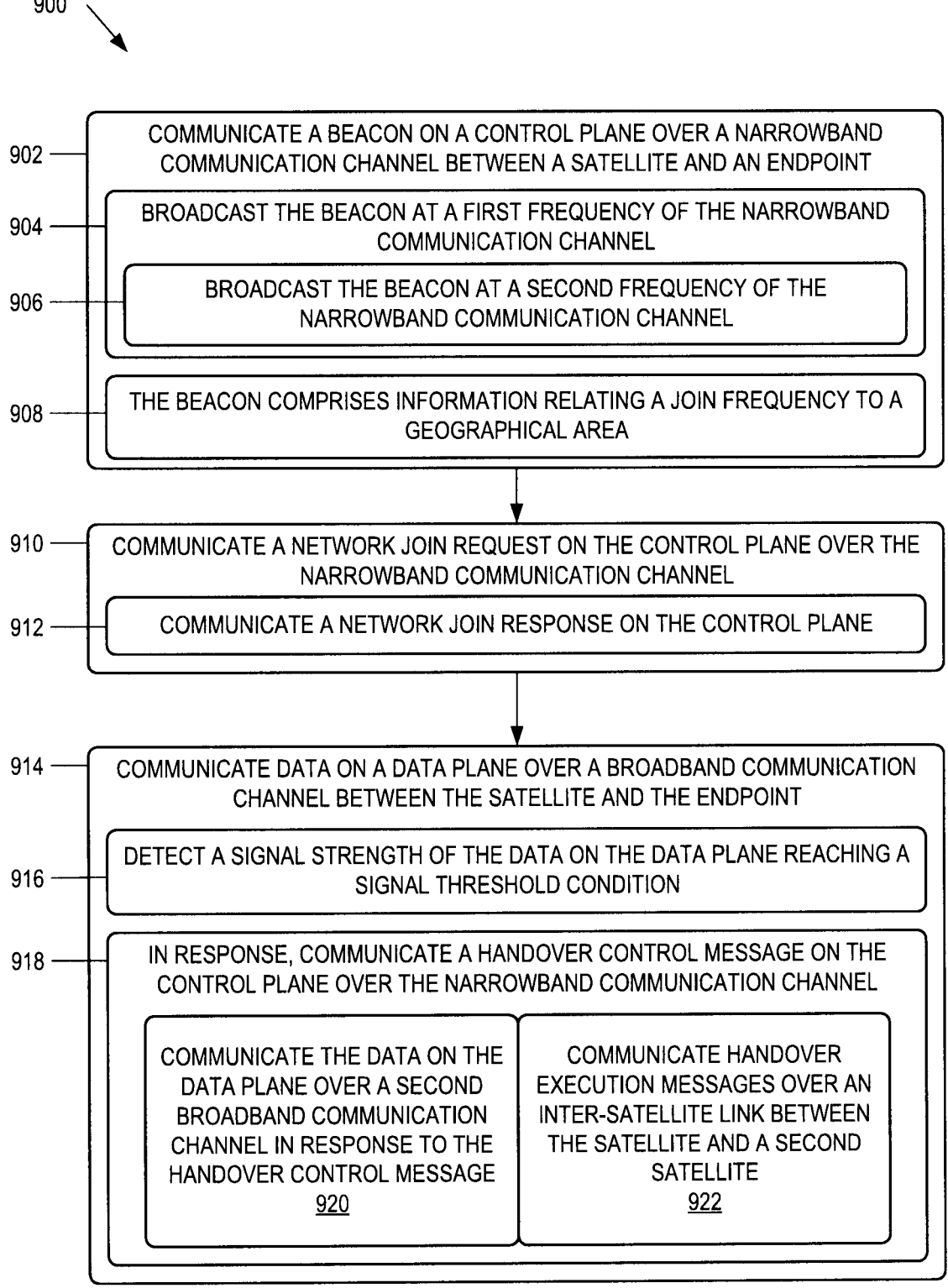

900

902 — COMMUNICATE A BEACON ON A CONTROL PLANE OVER A NARROWBAND COMMUNICATION CHANNEL BETWEEN A SATELLITE AND AN ENDPOINT

904 — BROADCAST THE BEACON AT A FIRST FREQUENCY OF THE NARROWBAND COMMUNICATION CHANNEL

906 — BROADCAST THE BEACON AT A SECOND FREQUENCY OF THE NARROWBAND COMMUNICATION CHANNEL

908 — THE BEACON COMPRISES INFORMATION RELATING A JOIN FREQUENCY TO A GEOGRAPHICAL AREA

910 — COMMUNICATE A NETWORK JOIN REQUEST ON THE CONTROL PLANE OVER THE NARROWBAND COMMUNICATION CHANNEL

912 — COMMUNICATE A NETWORK JOIN RESPONSE ON THE CONTROL PLANE

914 — COMMUNICATE DATA ON A DATA PLANE OVER A BROADBAND COMMUNICATION CHANNEL BETWEEN THE SATELLITE AND THE ENDPOINT

916 — DETECT A SIGNAL STRENGTH OF THE DATA ON THE DATA PLANE REACHING A SIGNAL THRESHOLD CONDITION

918 — IN RESPONSE, COMMUNICATE A HANDOVER CONTROL MESSAGE ON THE CONTROL PLANE OVER THE NARROWBAND COMMUNICATION CHANNEL

COMMUNICATE THE DATA ON THE DATA PLANE OVER A SECOND BROADBAND COMMUNICATION CHANNEL IN RESPONSE TO THE HANDOVER CONTROL MESSAGE
920

COMMUNICATE HANDOVER EXECUTION MESSAGES OVER AN INTER-SATELLITE LINK BETWEEN THE SATELLITE AND A SECOND SATELLITE
922

FIG. 9

COMPUTING SYSTEM    1000

LOGIC SUBSYSTEM
1002

VOLATILE MEMORY
1004

NON-VOLATILE STORAGE DEVICE
1006

DISPLAY SUBSYSTEM
1008

INPUT SUBSYSTEM
1010

COMMUNICATION SUBSYSTEM
1012

SATELLITES HAVING BROADBAND AND NARROWBAND COMMUNICATION HARDWARE

BACKGROUND

Many satellites use broadband radio to communicate with one or more endpoint(s), such as to provide Internet connectivity. Such satellites can communicate over a plurality of broadband communication channels using a corresponding plurality of beamforming antennas. However, beamforming antennas can have a relatively narrow coverage area that move along with the satellite. As such, an endpoint can be in a coverage area of a broadband communication channel for a relatively short period of time.

SUMMARY

One example provides a satellite comprising narrowband communication hardware configured to communicate on a control plane over a narrowband communication channel using an omnidirectional antenna. The satellite further comprises broadband communication hardware configured to communicate on a data plane over a broadband communication channel using a beamforming antenna.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-2B schematically show example movement of a satellite relative to an endpoint.

FIGS. 3A-3B schematically show example movement of an endpoint relative to a satellite.

FIG. 9 shows a flow diagram of an example method for operating a satellite with both narrowband and broadband communication channels.

DETAILED DESCRIPTION

Figure 1:
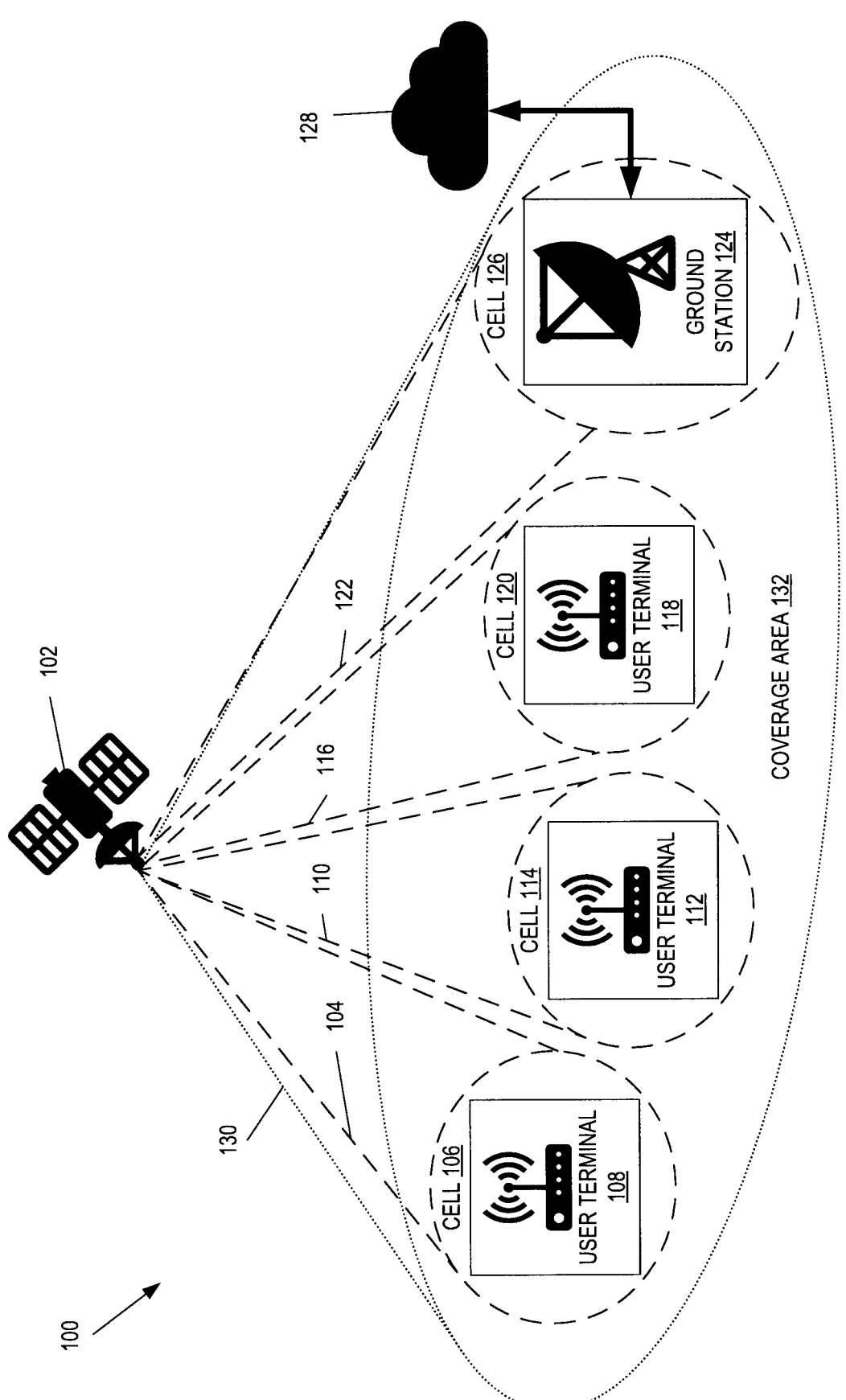
FIG. 1 schematically shows an example satellite communication system.

As previously mentioned, a communication satellite can communicate over broadband communication channels using corresponding beamforming antennas. The broadband channels can be used to implement a data plane over which the communication satellite communicates with an endpoint. However, due to movement of the satellite and/or movement of the endpoint, a coverage area of the broadband communication channel is generally within range of the endpoint for only a period of time. As such, the communication satellite can be configured to perform a handover protocol to transfer the data plane with the endpoint from the one broadband communication channel to another broadband communication channel. In the handover protocol, the communication satellite can communicate control messages on a control plane. However, communicating the control plane over the broadband communication channel presents several challenges. First, coverage areas of the different broadband communication channels may not overlap. Therefore, the broadband communication channel may be out of range of the endpoint before the handover protocol is completed. An incomplete handover protocol can result in a dropped connection between the communication satellite and the endpoint. Further, the broadband communication channel may be in range of the endpoint for around eight minutes or less. Performing handover protocols at such a frequency can lead to an unsuitably high probability of the handover protocol not completing and resulting in a dropped connection during one or more handovers.

Further, while satellite communications continue to grow in popularity, the radiofrequency spectrum is a finite resource. Thus, the continuing increase in the use of satellite-based broadband communication is increasing demands on the radiofrequency spectrum. Terrestrial networks and satellite networks may use the same band of the radiofrequency spectrum. However, many of the terrestrial networks are priority users of the bands of the radiofrequency spectrum. As such, satellite networks are designed to avoid causing harmful interference to the terrestrial networks. Further, the satellite networks may not be provided protection from the terrestrial networks, such as from radio interference. As such, information on the control plane can be lost due to interference with the terrestrial network. This can disrupt a connection to a satellite network.

Accordingly, examples are disclosed that relate to utilizing a narrowband communication channel for a control plane in satellite communications. Briefly, a satellite comprises broadband communication hardware configured to communicate on a data plane over a broadband communication channel using a beamforming antenna. The data plane is used to communicate data with an endpoint. The satellite further comprises narrowband communication hardware configured to communicate on a control plane over a narrowband communication channel using an omnidirectional antenna. Control messages related to controlling communication on the data plane are communicated on the control plane. Examples of control messages include a frequency of the data plane, a bandwidth of the data plane, network join requests, and handover control messages. The omnidirectional antenna used for the narrowband communication channel allows a larger footprint for satellite and endpoints compared to the beamforming antenna used for broadband communications. Therefore, a satellite can communicate and coordinate with all the endpoints within a coverage area of the narrowband communication channel, and vice versa. Further, as will be described in more detail below, the coverage area of the narrowband communication channel overlaps coverage areas of a plurality of broadband communication channels of the satellite. This helps to maintain connectivity on the control plane for longer than a coverage area of a single broadband communication channel.

The narrowband communication channel can be config-ured to operate under a noise floor in the presence of broadband networks at a low power. More specifically, the narrowband communication channel is configured to use modulation techniques that can work below a noise floor of other broadband communication, such as LoRa (long range) by the LoRa ALLIANCE, or another suitable low-power, wide-area-network (LPWAN), for example. Such modula-tion techniques can leverage spread modulation techniques. As a specific example, chirp spread spectrum utilizes wide-band linear frequency modulation chirp pules to encode information. The chirp is a sinusoidal wave modulated such that the frequency increases or decreases over time. Such modulation techniques may avoid interfering with the ter-restrial networks.

FIG. 1 schematically illustrates an example satellite com-munication system 100 utilizing both narrowband and broadband communication channels. Satellite communica-tion system 100 comprises a satellite 102 configured to communicate with a plurality of endpoints. In the depicted example, satellite 102 is configured to provide broadband Internet to a plurality of endpoints. As such, satellite 102 comprises broadband communication hardware configured to communicate on a data plane over a first broadband communication channel 104 using a first beamforming antenna. First broadband communication channel 104 can comprise a bandwidth on the order of megahertz (MHz). In some examples, first broadband communication channel 104 is configured to use one or more of the C band (4 to 8 GHZ), the Ku band (10-18 GHz), or the Ka band (18-31 GHZ) of the radiofrequency spectrum.

As shown, first broadband communication channel 104 has a corresponding first cell 106. In some examples, a coverage area of first cell 106 is on the order of one kilometer by one kilometer. In other examples, first cell 106 can have a coverage area with a different size. Satellite 102 is configured to communicate data on the data plane over first broadband communication channel 104 with an end-point in the form of a first user terminal 108. First user terminal 108 can be configured as an end-user communica-tion device and/or an Internet hotspot, as examples. In other examples, an endpoint can be a ground station, a device (e.g., phones, tablets, headsets, computers, etc.), integrated into a system on a vehicle, or can take other suitable forms. Similarly, satellite 102 is configured to communicate on the data plane over a second broadband communication channel 110 with a second user terminal 112 located within a coverage area of a second cell 114. Various attributes of second broadband communication channel 110 can be the same or different than first broadband communication chan-nel 104, such as an allocated band of the radiofrequency spectrum, for example. In a similar manner, satellite 102 is configured to communicate on the data plane over a third broadband communication channel 116 with a third user terminal 118 located within a coverage area of a third cell 120, and to communicate on the data plane over a fourth broadband communication channel 122 with a ground sta-tion 124 located within a coverage area of a fourth cell 126. Ground station 124 is configured to communicate with cloud 128 to help provide Internet and/or other communication to a specified location, such as a remote location and/or a mobile location, for example. In the depicted example, satellite 102 communicates over four different broadband communications channels. In other examples, a satellite can communicate over any other suitable number of broadband communications channels.

Satellite 102 further comprises narrowband communica-tion hardware configured to communicate on a control plane over a narrowband communication channel 130 using an omnidirectional antenna. In some examples, narrowband communication channel 130 comprises a bandwidth on the order of hundreds of kilohertz (kHz). Further, narrowband communication channel 130 can be configured to operate in very high frequency (VHF) bands and/or ultra high fre-quency (UHF) bands of the radiofrequency spectrum. The control plane configures or otherwise controls the data plane over first, second, third, and fourth broadband communica-tion channels 104, 110, 116, 122. As a specific example, messages on the control plan can indicate an allocated band of the radiofrequency spectrum for the data plane over first broadband communication channel 104.

As shown, a coverage area 132 of narrowband commu-nication channel 130 overlaps the coverage areas of first cell 106, second cell 114, third cell 120, and fourth cell 126. In some examples, coverage area 132 can comprise a footprint up to tens of thousands of square kilometers. In such a manner, the control plane over narrowband communication channel 130 overlaps first broadband communication chan-nel 104, second broadband communication channel 110, third broadband communication channel 116, and fourth broadband communication channel 122. More specifically, communication on the control plane over narrowband com-munication channel 130 can be continuous when the data plane is transferred between two broadband communication channels, referred to as handover. Example handovers are discussed in more detail with reference to FIGS. 2A, 2B, 3A, and 3B.

As previously mentioned, narrowband communication channel 130 can be configured to use modulation techniques that can operate below a noise floor of a broadband com-munication channel. Such a configuration helps to reduce harmful interference to terrestrial networks and/or loss of information on the control plane over narrowband commu-nication channel 130 than communicating a control plane over a broadband communication channel. FIG. 1 is illus-trative. In other examples, ground station 124 can be omit-ted. Further, while three endpoints are depicted, in other examples, one, two, or more than three endpoints can be used. While satellite communication system 100 is depicted in the form of a satellite Internet provider system, in other examples, satellite communication system 100 can be in the form of a remote sensing system, an Earth observation system, or another suitable satellite system utilizing both broadband and narrowband communication channels.

Figure 2B:
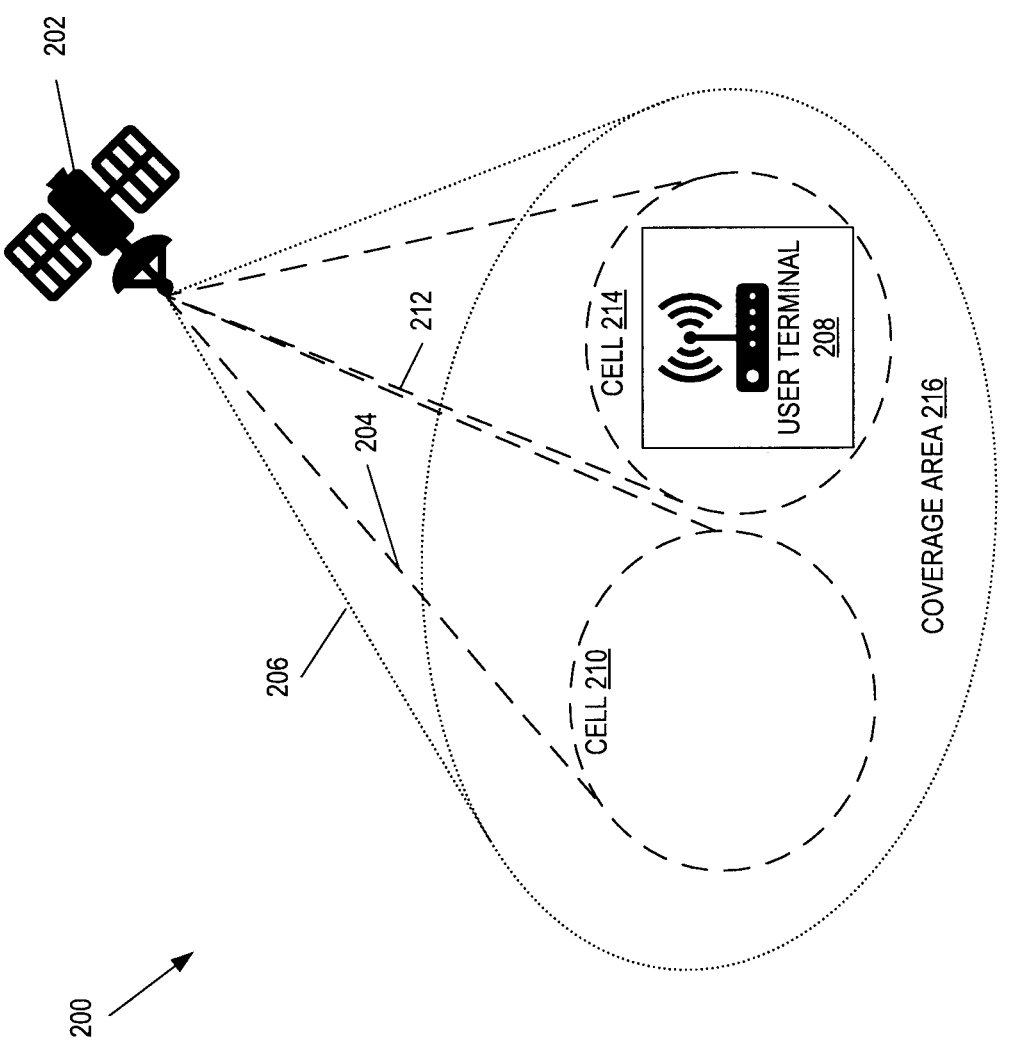

As previously mentioned, one or more of a satellite and an endpoint can move relative to the other. FIGS. 2A, 2B, 3A, and 3B schematically depict various examples of such movement. First, FIGS. 2A-2B schematically illustrate an example satellite communication system 200 comprising a satellite 202 configured as a low earth orbit satellite. Similar to satellite 102, satellite 202 comprises broadband commu-nication hardware configured to communicate on a data plane over a first broadband communication channel 204 using a beamforming antenna. Further, satellite 202 com-prises narrowband communication hardware configured to communicate on a control plane over a narrowband com-munication channel 206 using an omnidirectional antenna.

In FIG. 2A, satellite 202 is communicating data on the data plane over first broadband communication channel 204 with a user terminal 208 located within a coverage area of first broadband communication channel 204, or a first cell 210. As satellite 202 moves, first cell 210 moves out of range of user terminal 208, and a coverage area of a second broadband communication channel 212, or a second cell 214, moves into range of user terminal 208. In some examples, first cell 210 and user terminal 208 may be in range of each other for around one to ten minutes. As such, satellite 202 is configured to transfer the data plane with user terminal 208 from first broadband communication channel 204 to second broadband communication channel 212 using a handover protocol. Control messages for the handover protocol are communicated on a control plane over narrowband communication channel 206. A coverage area 216 of narrowband communication channel 206 overlaps first cell 210 and second cell 214 and can maintain connectivity of the control plane with user terminal 208 during a transfer of the data plane from first broadband communication channel 204 to second broadband communication channel 212. In such a manner, narrowband communication channel 206 may experience fewer dropped connections on the control plane than communicating on a control plane over a broadband communication channel. An example handover protocol is discussed with reference to FIG. 7.

Continuing, in FIG. 2B, satellite 202 has performed the handover protocol and now communicates the data on the data plane over second broadband communication channel 212 with user terminal 208. FIGS. 2A and 2B, are illustrative. While satellite communication system 200 is shown with two broadband communication channels, three or more broadband communication channels can be used. In other examples, another satellite system utilizing both narrowband and broadband communication channels can be used.

FIGS. 3A and 3B schematically depict an example satellite communication system 300, and illustrate an endpoint 302 moving relative to a satellite 304. In the example of FIGS. 3A and 3B, endpoint 302 is depicted in the form of an airplane. In other examples, endpoint 302 can be in the form of another vehicle, such as an unmanned aerial vehicle (UAV), a car, truck, camping vehicle, mobile cell tower, boat, submarine, unmanned ground or underwater vehicles, etc., for example. Similar to satellite 102, satellite 304 comprises broadband communication hardware configured to communicate on a data plane over a first broadband communication channel 306 using a beamforming antenna. Further, satellite 304 comprises narrowband communication hardware configured to communicate on a control plane over a narrowband communication channel 308 using an omnidirectional antenna. In FIG. 3A, satellite 304 communicates data on the data plane over first broadband communication channel 306 with endpoint 302. As endpoint 302 moves relative to satellite 304, endpoint 302 moves out of range of a coverage area of first broadband communication channel 306, or a first cell 310, and into range of a coverage area of a second broadband communication channel 312, or a second cell 314. Similar to satellite communication system 200, satellite communication system 300 performs a handover protocol on the control plane to transfer the data plane with endpoint 302 from first broadband communication channel 306 to second broadband communication channel 312. An example handover protocol is discussed with reference to FIG. 7. FIGS. 3A and 3B, are illustrative. While satellite communication system 300 is shown with two broadband communication channels, three or more broadband communication channels can be used. In other examples, satellite 304 can also move relative to endpoint 302. In further examples, another satellite communication system utilizing both narrowband and broadband communication channels can be used.

Figure 4A:
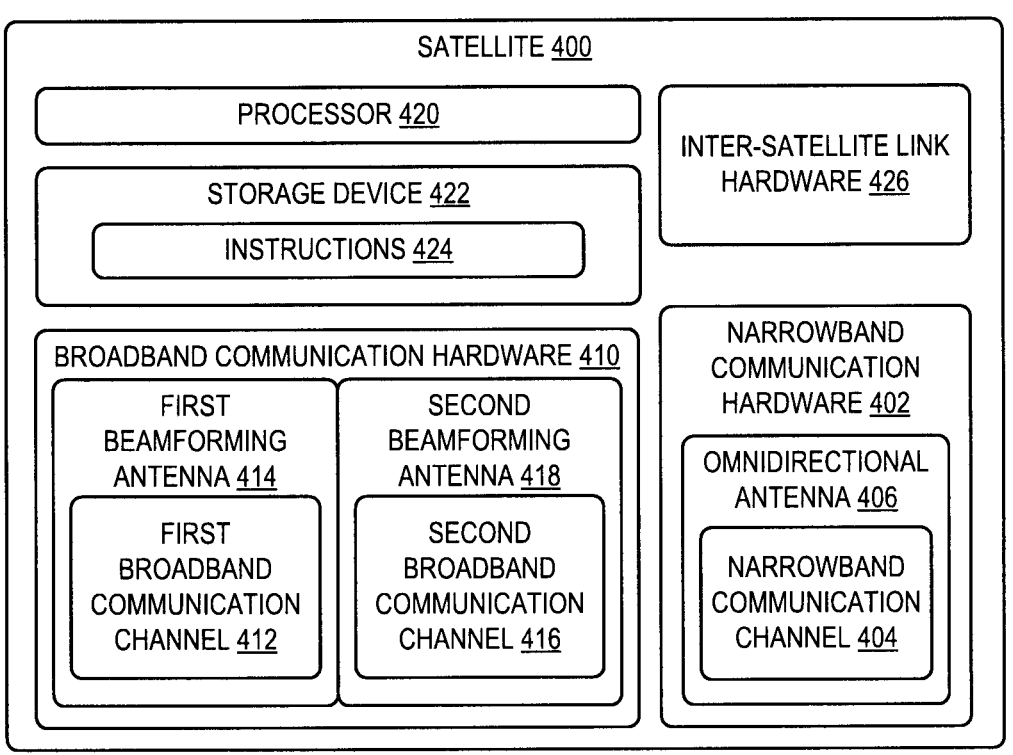
FIG. 4A shows a block diagram of an example satellite.

FIG. 4A shows a block diagram of an example satellite 400. Satellite 102, satellite 202, and satellite 304 are examples of satellite 400. In various examples, satellite 400 can be configured as a communication satellite, a remote sensing satellite, an Earth observation satellite, and/or a low Earth orbit satellite. Satellite 400 comprises narrowband communication hardware 402 configured to communicate on a control plane over a narrowband communication channel 404 using an omnidirectional antenna 406. Narrowband communication hardware 402 is configured to communicate the control plane at one or more frequencies of the narrowband communication channel 404.

Satellite 400 further comprises broadband communication hardware 410 configured to communicate on a data plane over a first broadband communication channel 412 using a first beamforming antenna 414. Data on the data plane can include Internet data, remote sensing data, or other suitable data. Similarly, broadband communication hardware 410 is further configured to communicate on the data plane over a second broadband communication channel 416 using a second beamforming antenna 418. While satellite 400 is depicted with two broadband communication channels and two corresponding beamforming antennas, it will be appreciated that in other examples, three or more broadband communication channels and corresponding beamforming antennas can be used.

Satellite 400 further comprises a processor 420 and a storage device 422 comprising instructions 424 operable by processor 420. Instructions 424 comprise instructions to perform various communication protocols, such as a network bootstrapping protocol and/or a handover protocol. Control messages related to the communication protocols are communicated on the control plane over narrowband communication channel 404. The networking bootstrapping protocol is used to facilitate an endpoint joining a network of satellite 400, as will be discussed with reference to FIG. 5. Handover protocols are used to transfer the data plane between broadband communication channels as will be discussed with reference to FIGS. 7 and 8. Further aspects of processor 420 and storage device 422 are discussed with reference to FIG. 10. Satellite 400 further comprises an inter-satellite link hardware 426 configured to communicate with another satellite, such as handover execution messages, for example.

Figure 4B:
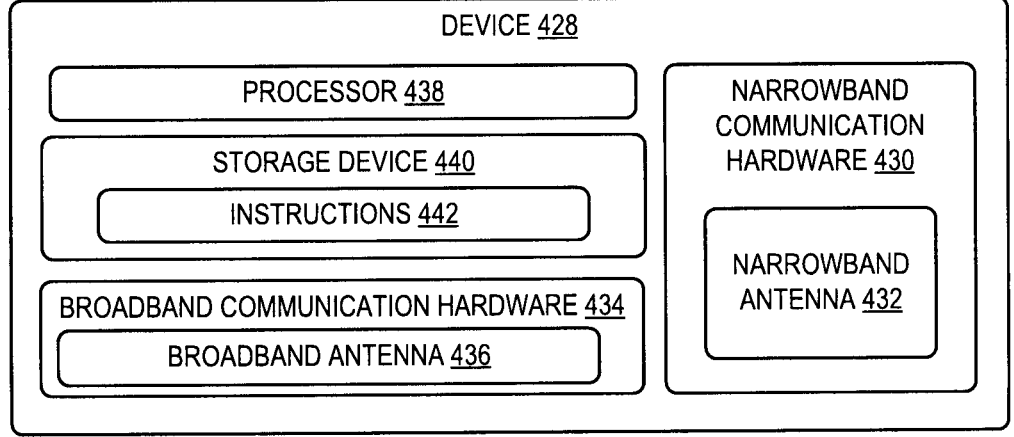
FIG. 4B shows a block diagram of an example device for use as an endpoint.

Satellite 400 is configured to communicate with device 428, which is depicted as a block diagram in FIG. 4B. Device 428 can be an endpoint for communication with satellite 400. In various examples, device 428 can comprise a phone, tablet, laptop or another suitable user device. In some examples, device 428 can be configured to be incorporated into a vehicle, such as manned or unmanned aircraft, watercraft, or ground craft, for example. Device 428 comprises narrowband communication hardware 430 configured to communicate with satellite 400 on the control plane over narrowband communication channel 404 using a narrowband antenna 432. Device 428 further comprises broadband communication hardware 434 configured to communicate with satellite 400 on the data plane using a broadband antenna 436. The data plane can be communicated over first broadband communication channel 412 or second broadband communication channel 416. As discussed in more detail in FIG. 7, a handover protocol is performed to transfer the data plane between first broadband communication channel 412 and second broadband communication channel 416. Similar to satellite 400, device 428 comprises a processor 438 and a storage device 440 comprising instructions 442 operable by processor 438.

Figure 5:
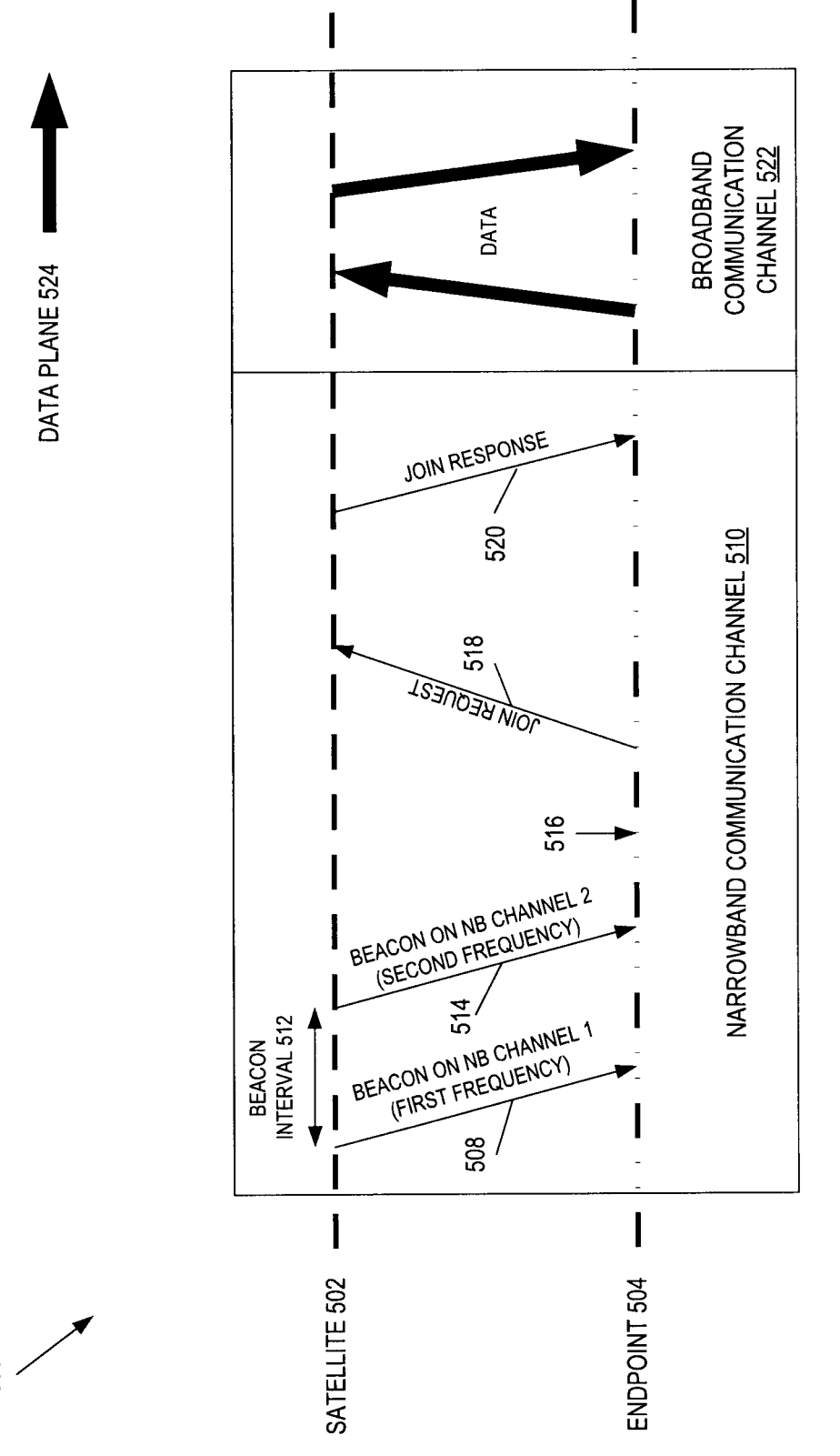
FIG. 5 schematically shows an example communication diagram for a network bootstrapping protocol between an endpoint and a satellite.

As previously mentioned, a satellite having broadband and narrowband communication channels according to the disclosed examples performs a network bootstrapping protocol to facilitate an endpoint joining a network of the satellite, such as after a cold reset, for example. FIG. 5 schematically illustrates an example communication diagram 500 for a network bootstrapping protocol between a satellite 502 and an endpoint 504. Satellite 502 is an example of satellite 400. Satellite 502 broadcasts a beacon on a control plane 506 at a first frequency 508 of a narrowband communication channel 510. The beacon comprises information relating join frequencies to corresponding locations within a coverage area of narrowband communication channel 510. In some examples, the information of the beacon can change on an occasional basis. An example beacon is discussed with reference to FIG. 6. After a beacon interval 512, satellite 502 broadcasts the beacon on control plane 506 at a second frequency 514 of narrowband communication channel 510. In various examples, beacon interval 512 comprises an interval of 5 to 15 seconds or another suitable period. Satellite 502 and endpoint 504 can be time synced using a global position system (GPS) signal. Time syncing can help endpoint 504 to determine a specified time satellite 502 will broadcast the beacon. While communication diagram 500 depicts two frequencies, in other examples three or more frequencies can be used. In such a manner, satellite 502 can continue to broadcast the beacon after beacon interval 512 using sequential circular hopping across a predefined list of frequencies of narrowband communication channel 510. In some examples, endpoint 504 is also frequency hopping. The frequency hopping can increase a probability that at least one beacon is received by endpoint 504. In such a manner, satellite 502 and endpoint 504 can communicate the beacon on control plane 506 over narrowband communication channel 510 with less interference to terrestrial networks as previously discussed. In other examples, a single frequency can be used to broadcast the beacon.

Endpoint 504 determines, at 516, a join frequency based on the beacon and a geolocation of endpoint 504. Then, endpoint 504 sends a network join request 518 to satellite 502 on control plane 506 at the join frequency over narrowband communication channel 510. Sending the network join request at the join frequency over narrowband communication channel 510 can reduce interference between the join request and terrestrial networks in a vicinity. In response, satellite 502 sends a network join response 520 to endpoint 504 on control plane 506 over narrowband communication channel 510. The network join response indicates a broadband communication channel 522 to use at the geolocation of endpoint 504. In some examples, the join response can indicate that a narrowband portion (e.g., less than 100 kHz) of broadband communication channel 522 is to be used for narrowband communication channel 510. Such a configuration enables narrowband communication channel 510 to use a band of the radiofrequency spectrum that is licensed by satellite 502 for use of broadband communication channel 522.

Continuing, satellite 502 and endpoint 504 communicate data on a data plane 524 over a broadband communication channel 522. Performing the bootstrapping protocol for endpoint 504 over narrowband communication channel 510 before using broadband communication channel 522 can help to reduce the risk of causing harmful interference to terrestrial networks, and/or reduce a probability of losing packets on the control plan caused by interference with the terrestrial networks. Communication diagram 500 is illustrative. In other examples, another communication diagram can be used for a network bootstrapping protocol between an endpoint and a satellite.

Figure 6:
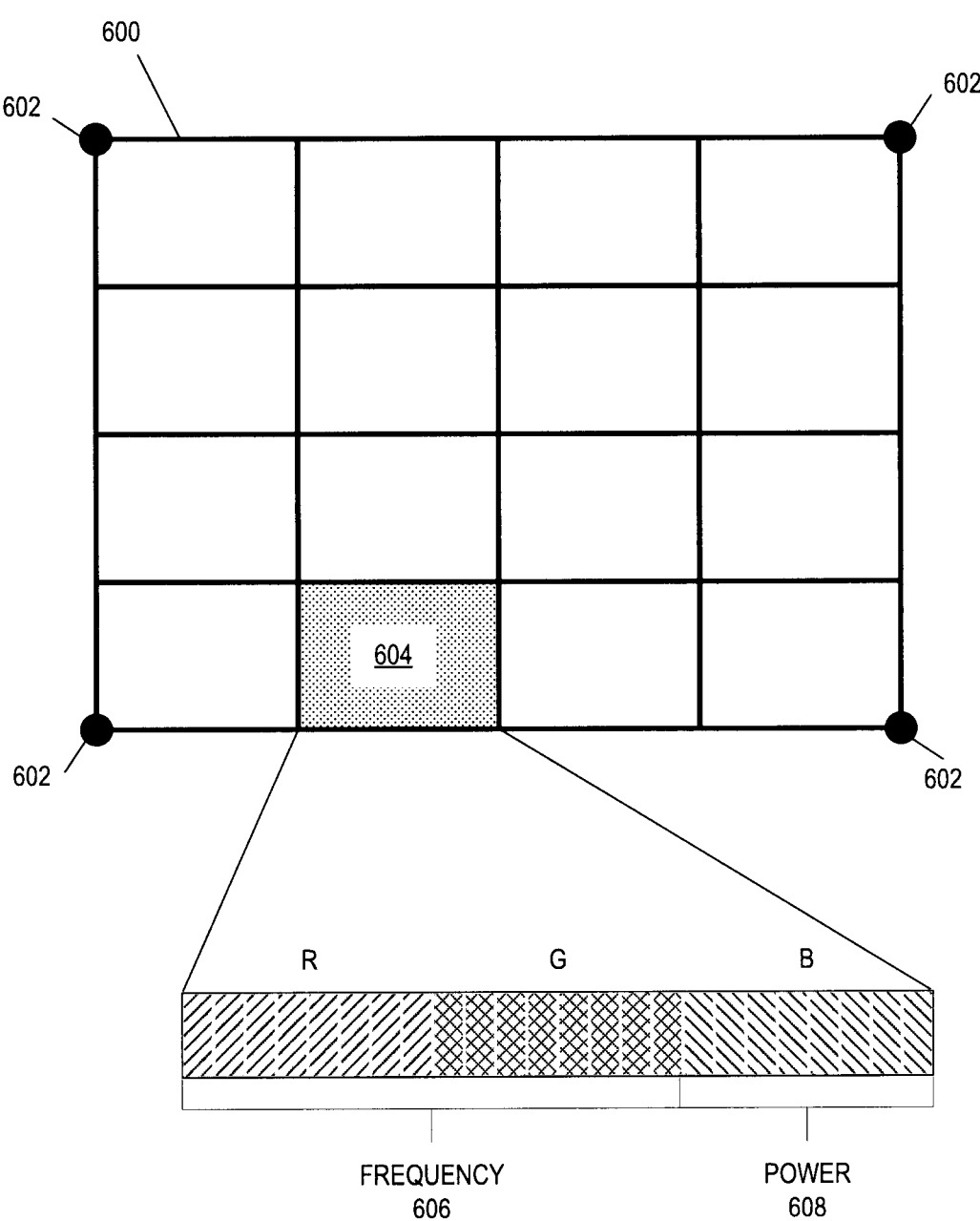
FIG. 6 shows an example beacon used in the network bootstrapping protocol of FIG. 5.

FIG. 6 schematically depicts an example beacon 600. Beacon 600 can be used in the bootstrapping protocol of FIG. 5. Beacon 600 comprises an image having a plurality of pixels. While beacon 600 is depicted as having a four-by-four array of pixels, it will be appreciated that any suitable array of pixels can be used. In some examples the image can comprise an array of 50 by 50 pixels. The image can be in any suitable format, such as JPEG, PNG, bitmap, etc., for example. Beacon 600 further comprises a plurality of geo-coordinates 602 indicating an outer dimension of a coverage area of a narrowband communication channel. Each pixel 604 of the plurality of pixels represents a corresponding specified geographical area within geo-coordinates 602. The corresponding specified geographical area can comprise a one kilometer by one kilometer area, or another suitable area. Each pixel 604 comprises information indicating a join frequency 606 and a desired power envelope 608 for the corresponding specified geographical area. More specifically, each pixel 604 comprises red (R), green (G), and blue (B) color codes. As shown, the red and green color codes indicate join frequency 606. In some examples, a number of the red and green color codes divided by 10 is join frequency 606 in megahertz (MHz). Further, the blue color code indicates an upper range of desired power envelope 608 in decibel-milliwatts (dBm). Desired power envelope 608 indicates a desired range of antenna output power to communicate at join frequency 606. Join frequency 606 and/or desired power envelope 608 can be selected based on known radiofrequency spectrum usage in the corresponding specified geographical area, for example. In other examples, the red, green, and/or blue color codes can indicate another attribute for communicating on a narrowband communication channel and/or a broadband communication channel. FIG. 6 is illustrative. In other examples, another suitable beacon can be used.

Figure 7:
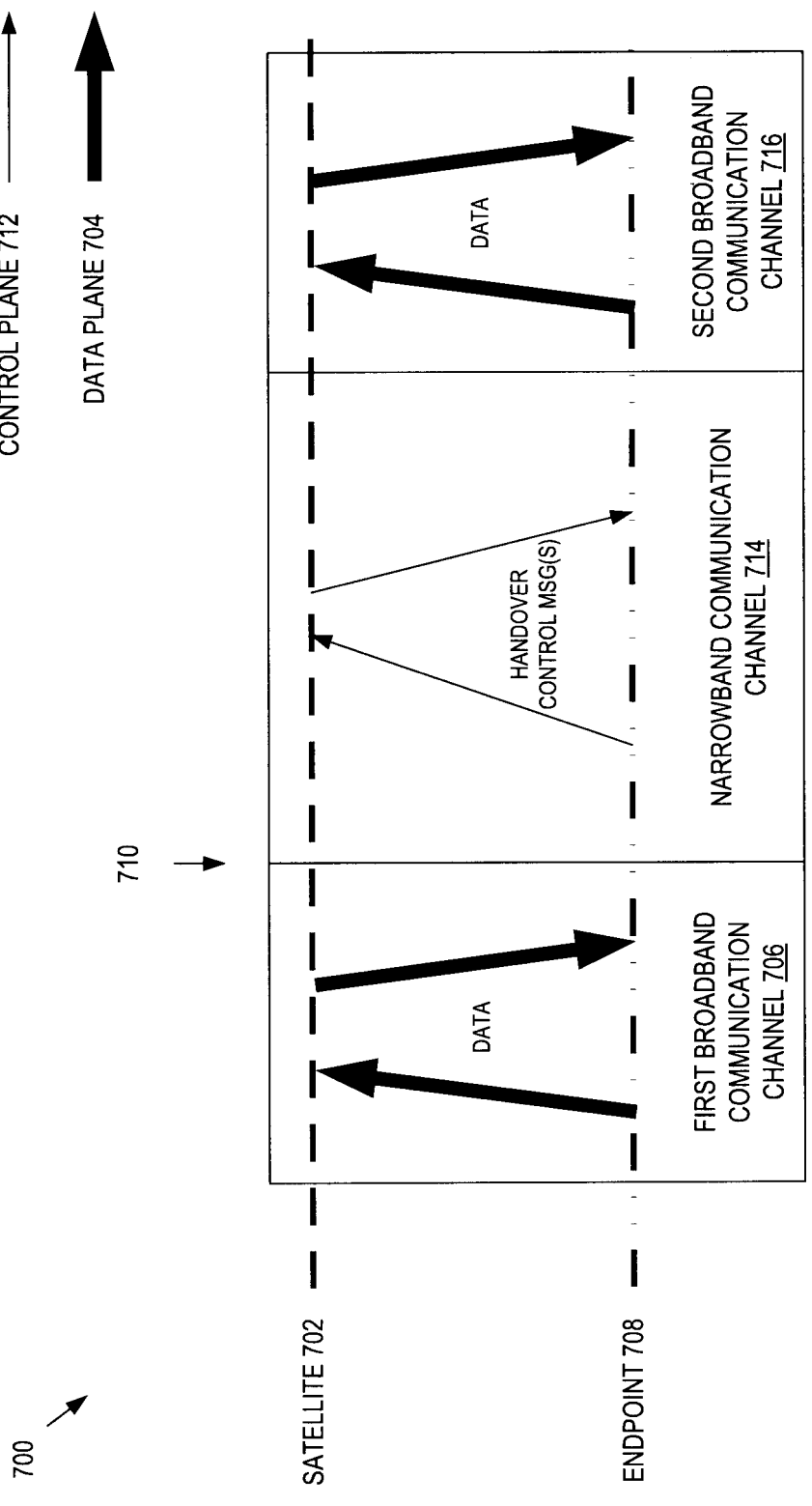
FIG. 7 schematically shows an example communication diagram for a handover protocol between two broadband cells of a single satellite.

As previously mentioned, a satellite can perform a handover protocol to transfer a data plane from one broadband communication channel to another broadband communication channel. FIG. 7 schematically illustrates an example communication diagram 700 for a handover protocol between two broadband communication channels of a satellite 702 (e.g., an inter-cell handover). Satellite 702 is an example of satellite 400. Communication diagram 700 begins with satellite 702 communicating data on a data plane 704 over a first broadband communication channel 706 with an endpoint 708. Satellite 702 and/or endpoint 708 monitors a signal strength of the data on data plane 704 over first broadband communication channel 706. As indicated at 710, a handover of data plane 704 is determined as imminent when the signal strength reaches a threshold condition, such as below a specified value, for example. Further, satellite 702 and endpoint 708 communicate handover control message(s) on a control plane 712 over a narrowband communication channel 714. Satellite 702 is configured to transfer a network context of data plane 704 from first broadband communication channel 706 to a second broadband communication channel 716. One example of a network context is a temporal location during video streaming. The network context helps to enable a smooth handover of data plane 704. Then, communication diagram 700 continues with satellite 702 and endpoint 708 communicating the data on data plane 704 over a second broadband communication channel 716. In some examples, a handover protocol can be performed after one to ten minutes of endpoint 708 being in the coverage area of first broadband communication channel 706. In examples where a narrowband communication channel uses a narrowband of a broadband communication channel, the narrowband of first broadband communication channel 706 is used for narrowband communication channel 714 until second broadband communication channel 716 is allocated to endpoint 708. FIG. 7 is illustrative. In other examples, another communication diagram for a handover protocol between broadband communication channels of satellite 702 can be used.

Figure 8:
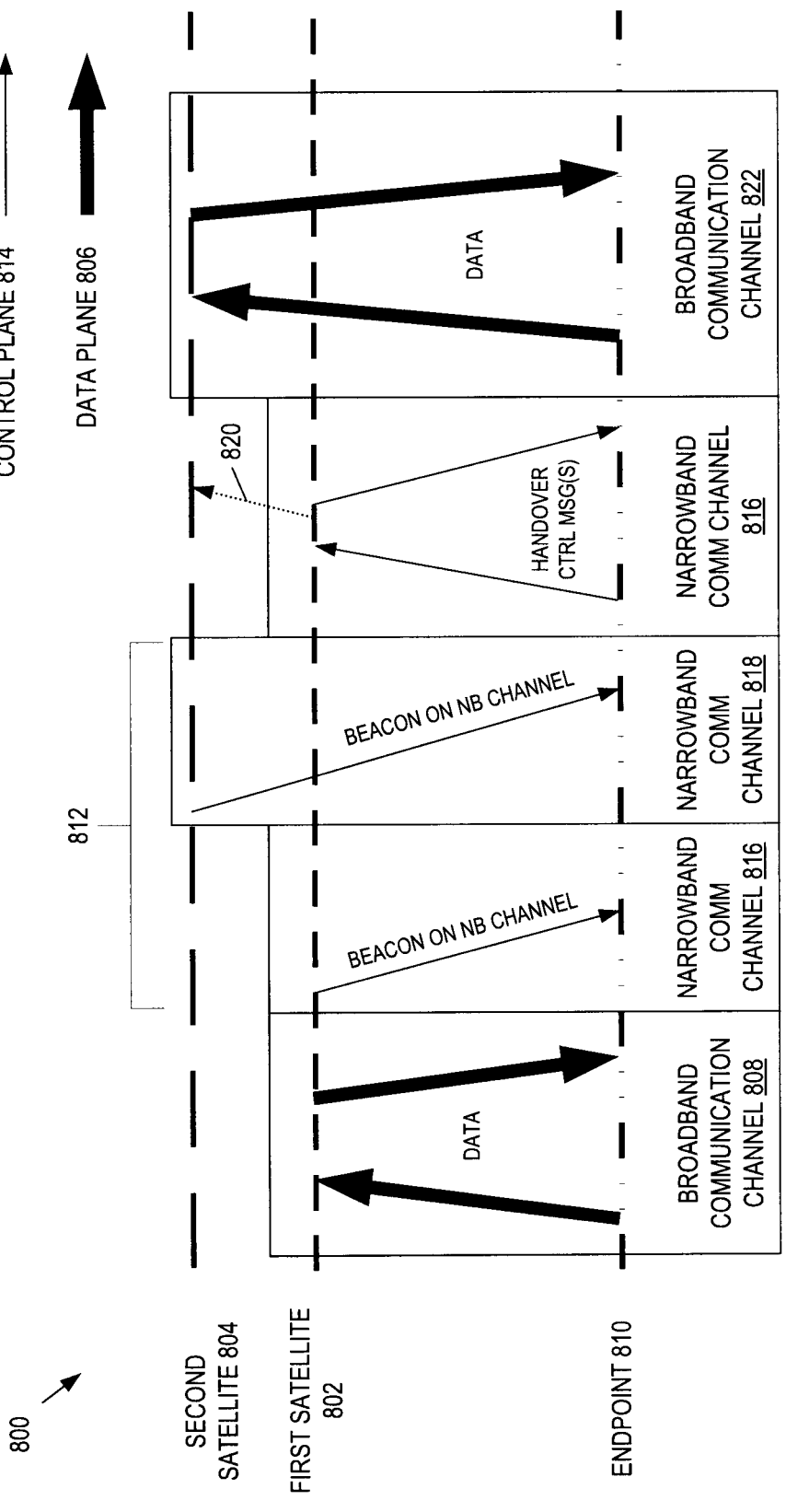
FIG. 8 schematically shows an example communication diagram for a handover protocol between different satellites.

The example of FIG. 7 depicts a handover protocol for transferring a data plane between broadband communication channels of a satellite. In other examples, the data plane can be transferred to another satellite. FIG. 8 schematically depicts an example communication diagram 800 for a handover protocol between a first satellite 802 and a second satellite 804. Each of first satellite 802 and second satellite 804 are examples of satellite 400. Communication diagram 800 begins with first satellite 802 communicating data on a data plane 806 over a first broadband communication channel 808 with an endpoint 810. At 812, communication diagram 800 determines an imminent handover between first satellite 802 and second satellite 804. As shown, endpoint 810 receives a first beacon on a control plane 814 over a first narrowband communication channel 816 of first satellite 802 and a second beacon on control plane 814 over a second narrowband communication channel 818 of second satellite 804. Endpoint 810 further compares a signal strength of the first beacon with a signal strength of the second beacon to determine when to initiate the handover protocol. Then, first satellite 802 and endpoint 810 communicate handover control message(s) on control plane 814 over first narrowband communication channel 816. First satellite communicates handover execution messages over an inter-satellite link 820 with second satellite 804 during the communication of the handover control message(s) on control plane 814 over first narrowband communication channel 816 with endpoint 810. The handover execution messages comprise information on a network context of data plane 806, such as a temporal location during video streaming, for example. Then, communication diagram 800 continues with second satellite 804 and endpoint 810 communicating the data on data plane 806 over a second broadband communication channel 822. In some examples, five to seven minutes may pass between handovers between satellites. In such a manner, beacons on a control plane over a narrowband communication channel can help to determine an imminent inter-satellite handover before an endpoint is out of range of a broadband communication channel of a satellite. Further, narrowband communication channels of different satellites can have overlapping coverages areas, and can help to perform a smooth handover from a first broadband communication channel of a first satellite to a second broadband communication channel of a second satellite. FIG. 8 is illustrative. In other examples, another communication diagram for a handover protocol between satellites can be used.

FIG. 9 illustrates a flow diagram of an example method 900 for operating a satellite with both broadband and narrowband communication channels. Method 900 can be performed by any suitable satellite, such as satellite 400, for example. Method 900 comprises, at 902, communicating a beacon on a control plane over a narrowband communication channel between the satellite and an endpoint, such as device 428, for example. In various examples, the endpoint can be a communication device, an installation, or incorporated into a vehicle. Examples of suitable endpoints include user terminals, ground stations, phones, tablets, another consumer device, airplanes, UAV, and ground vehicles. Communicating the beacon on the control plane over the narrowband communication channel can comprise broadcasting, at 904, the beacon at a first frequency of the narrowband communication channel, and optionally broadcasting, at 906, the beacon at a second frequency of the narrowband communication channel after broadcasting the beacon at the first frequency. The beacon comprises information relating a join frequency to a geographical area, as indicated at 908. The beacon can be beacon 600, for example.

Continuing, method 900 comprises, at 910, communicating a network join request on the control plane over the narrowband communication channel between the satellite and the endpoint. Further, method 900 comprises, at 912, communicating a network join response on the control plane after communicating the network join request on the control plane.

Method 900 further comprises, at 914, communicating data on a data plane over a broadband communication channel between the satellite and the endpoint. As previously mentioned, as the satellite and/or the endpoint move relative to each other, a handover protocol is performed to transfer the data plane between broadband communication channels. As such, method 900 comprises, at 916, detecting a signal strength of the data on the data plane over the broadband communication channel reaching a signal threshold condition. In some examples, the signal threshold condition comprises when the signal strength drops below a specified value. In response, method 900 comprises, at 918, communicating a handover control message on the control plane over the narrowband communication channel. In examples where the broadband communication channel is a first broadband communication channel, method 900 comprises, at 920, communicating the data on the data plane over a second broadband communication channel in response to the handover control message. In examples where the satellite is a first satellite, the method further comprises, at 922, communicating handover execution messages over an inter-satellite link between the first satellite and a second satellite in response to the handover control message. After the first and second satellites communicate the handover execution messages, the second satellite and the endpoint communicate on the data plane over a broadband communication channel of the second satellite. In such a manner, satellites communicating on a control plane over a narrowband communication channel can help to smoothly transfer a data plane between broadband communication channels with less dropped connections than using a broadband communication channel for the control plane.

A satellite comprising narrowband communication hardware and broadband communication hardware as disclosed herein can communicate on a control plane over a narrowband communication channel with (1) less interference to terrestrial networks and/or (2) reduced loss of messages on the control plane, than a control plane over a broadband communication channel.

In some examples, the methods and processes described herein can be tied to a computing system of one or more computing devices. In particular, such methods and processes can be implemented as a computer-application program or service, an application-programming interface (API), a library, and/or other computer-program products.

Figure 10:
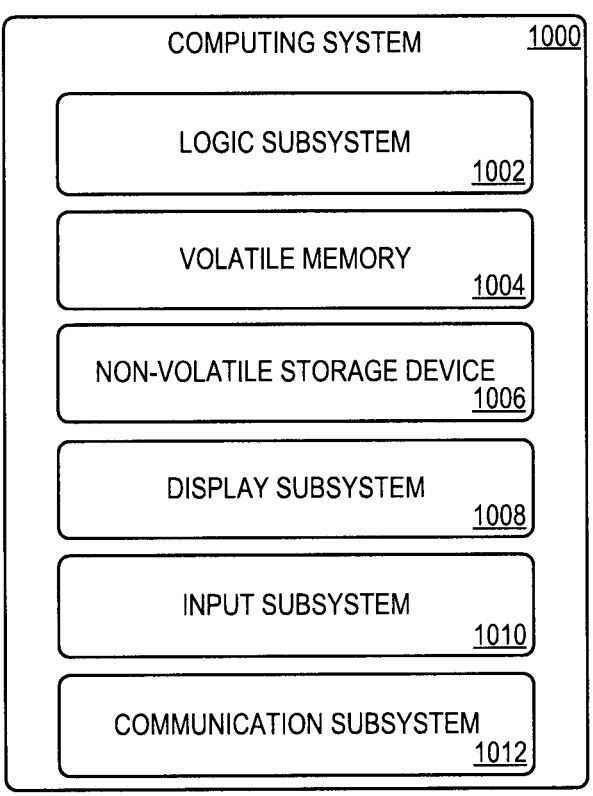
FIG. 10 shows a block diagram of an example computing system.

FIG. 10 schematically shows a non-limiting example of a computing system 1000 that can enact one or more of the methods and processes described above. Computing system 1000 is shown in simplified form. Computing system 1000 can embody satellite 400 or device 428, for example. Computing system 1000 can take the form of one or more personal computers, server computers, tablet computers, network computing devices, mobile computing devices, mobile communication devices (e.g., smart phone), and/or other computing devices.

Computing system 1000 includes a logic subsystem 1002 volatile memory 1004, and a non-volatile storage device 1006. Computing system 1000 can optionally include a display subsystem 1008, input subsystem 1010, communication subsystem 1012, and/or other components not shown in FIG. 10.

Logic subsystem 1002 includes one or more physical devices configured to execute instructions. For example, the logic processor can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor can include one or more physical processors (hardware) configured to execute software instructions. Additionally or alternatively, the logic processor can include one or more hardware logic circuits or firmware devices configured to execute hardware-implemented logic or firmware instructions. Processors of the logic subsystem 1002 can be single-core or multi-core, and the instructions executed thereon can be configured for sequential, parallel, and/or distributed processing. Individual components of the logic processor optionally can be distributed among two or more separate devices, which can be remotely located and/or configured for coordinated processing. Aspects of the logic processor can be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 can be transformed—e.g., to hold different data.

Non-volatile storage device 1006 can include physical devices that are removable and/or built-in. Non-volatile storage device 1006 can include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 can include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 can include physical devices that include random access memory. Volatile memory 1004 is typically utilized by logic subsystem 1002 to temporarily store information during processing of software instructions. It will be appreciated that volatile memory 1004 typically does not continue to store instructions when power is cut to the volatile memory 1004.

Aspects of logic subsystem 1002, volatile memory 1004, and non-volatile storage device 1006 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1008 can be used to present a visual representation of data held by non-volatile storage device 1006. The visual representation can take the form of a graphical user interface (GUI). As the herein described methods and processes change the data held by the non-volatile storage device, and thus transform the state of the non-volatile storage device, the state of display subsystem 1008 can likewise be transformed to visually represent changes in the underlying data. Display subsystem 1008 can include one or more display devices utilizing virtually any type of technology. Such display devices can be combined with logic subsystem 1002, volatile memory 1004, and/or non-volatile storage device 1006 in a shared enclosure, or such display devices can be peripheral display devices.

When included, input subsystem 1010 can comprise or interface with one or more user-input devices such as a keyboard, mouse, touch screen, or game controller. In some examples, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1012 can be configured to communicatively couple various computing devices described herein with each other, and with other devices. Communication subsystem 1012 can include wired and/or wireless communication devices compatible with one or more different communication protocols. As non-limiting examples, the communication subsystem can be configured for communication via a wireless telephone network, or a wired or wireless local- or wide-area network, such as a HDMI over Wi-Fi connection. In some examples, the communication subsystem can allow computing system 1000 to send and/or receive messages to and/or from other devices via a network such as the Internet.

Another example provides a satellite comprising narrowband communication hardware configured to communicate on a control plane over a narrowband communication channel using an omnidirectional antenna, and broadband communication hardware configured to communicate on a data plane over a broadband communication channel using a beamforming antenna. In some such examples, the satellite alternatively or additionally is configured to provide broadband Internet. In some such examples, the satellite alternatively or additionally comprising a processor and a storage device comprising instructions operable by the processor to communicate a beacon on the control plane over the narrowband communication channel between the satellite and an endpoint, communicate a network join request on the control plane over the narrowband communication channel between the satellite and the endpoint, and communicate data on the data plane over the broadband communication channel between the satellite and the endpoint. In some such examples, the instructions to communicate the beacon on the control plane over the narrowband communication channel alternatively or additionally comprise instructions to broadcast the beacon at a first frequency of the narrowband communication channel, and broadcast the beacon at a second frequency of the narrowband communication channel after broadcasting at the first frequency. In some such examples, the instructions alternatively or additionally are operable to detect a signal strength of the data on the data plane over the broadband communication channel reaching a signal threshold condition, and in response, communicate a handover control message on the control plane over the narrowband communication channel. In some such examples, the broadband communication channel is a first broadband communication channel, and the instructions alternatively or additionally are operable to communicate the data on the data plane over a second broadband communication channel in response to the handover control message. In some such examples, the instructions alternatively or additionally are operable to communicate handover execution messages over an inter-satellite link between the satellite and another satellite in response to the handover control message.

Another example provides a method comprising communicating a beacon on a control plane over a narrowband communication channel between a satellite and an endpoint, communicating a network join request on the control plane over the narrowband communication channel between the satellite and the endpoint, and communicating data on a data plane over a broadband communication channel between the satellite and the endpoint. In some such examples, communicating the beacon on the control plane over the narrowband communication channel alternatively or additionally comprises broadcasting the beacon at a frequency of the narrowband communication channel. In some such examples, the frequency is a first frequency, and communicating the beacon on the control plane alternatively or additionally comprises broadcasting the beacon at a second frequency of the narrowband communication channel after broadcasting the beacon at the first frequency. In some such examples, the beacon alternatively or additionally comprises an image having a plurality of pixels, and each pixel of the plurality of pixels alternatively or additionally comprises information relating a join frequency to a geographical area corresponding to the pixel. In some such examples, the method alternatively or additionally comprises communicating a network join response on the control plane after communicating the network join request on the control plane. In some such examples, the method alternatively or additionally comprises detecting a signal strength of the data on the data plane over the broadband communication channel reaching a signal threshold condition, and in response, communicating a handover control message on the control plane over the narrowband communication channel. In some such examples, the broadband communication channel is a first broadband communication channel, and the method alternatively or additionally comprises communicating the data on the data plane over a second broadband communication channel in response to the handover control message. In some such examples, the satellite is a first satellite, and the method alternatively or additionally comprises communicating handover execution messages over an inter-satellite link between the first satellite and a second satellite in response to the handover control message.

Another example provides a device, comprising narrowband communication hardware configured to communicate on a control plane over a narrowband communication channel with a satellite, broadband communication hardware configured to communicate on a data plane over a broadband communication channel with the satellite, a processor, and a storage device comprising instructions operable by the processor to communicate a beacon on the control plane over the narrowband communication channel between the device and the satellite, communicate a network join request on the control plane over the narrowband communication channel between the device and the satellite, and communicate data on the data plane over the broadband_communication channel between the device and the satellite. In some such examples, the device alternatively or additionally comprises one or more of a phone, a tablet, or a laptop. In some such examples, the device alternatively or additionally is configured to be incorporated into a vehicle. In some such examples, the instructions alternatively or additionally are operable to detect a signal strength of the data on the data plane over the broadband communication channel reaching a signal threshold condition, and in response, communicate a handover control message on the control plane over the narrowband communication channel. In some such examples, the broadband communication channel is a first broadband communication channel, and the instructions alternatively or additionally are operable to communicate the data on the data plane over a second broadband communication channel with the satellite in response to the handover control message.

It will be understood that the configurations and/or approaches described herein are exemplary in nature, and that these specific examples or examples are not to be considered in a limiting sense, because numerous variations are possible. The specific routines or methods described herein can represent one or more of any number of processing strategies. As such, various acts illustrated and/or described can be performed in the sequence illustrated and/or described, in other sequences, in parallel, or omitted. Likewise, the order of the above-described processes can be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A satellite comprising:

narrowband communication hardware configured to communicate on a control plane over a narrowband communication channel using an omnidirectional antenna;

broadband communication hardware configured to communicate on a data plane over a broadband communication channel using a beamforming antenna; and a logic subsystem comprising a processor and a storage device comprising instructions operable by the logic subsystem to broadcast a beacon at a first frequency of the narrowband communication channel, and to broadcast the beacon at a second frequency of the narrowband communication channel after broadcasting at the first frequency.

2. The satellite of claim 1, wherein the satellite is configured to provide broadband Internet.

3. The satellite of claim 1, wherein the instructions are further operable by the processor to communicate the beacon on the control plane over the narrowband communication channel between the satellite and an endpoint;

communicate a network join request on the control plane over the narrowband communication channel between the satellite and the endpoint; and communicate data on the data plane over the broadband communication channel between the satellite and the endpoint.

4. The satellite of claim 3, wherein the instructions further are operable to detect a signal strength of the data on the data plane over the broadband communication channel reaching a signal threshold condition, and in response, communicate a handover control message on the control plane over the narrowband communication channel.

5. The satellite of claim 4, wherein the broadband communication channel is a first broadband communication channel, and the instructions are further operable to communicate the data on the data plane over a second broadband communication channel in response to the handover control message.

6. The satellite of claim 4, wherein the instructions are further operable to communicate handover execution messages over an inter-satellite link between the satellite and another satellite in response to the handover control message.

7. A method comprising:

communicating a beacon on a control plane over a narrowband communication channel between a satellite and an endpoint;

communicating a network join request, based at least upon the beacon, on the control plane over the narrowband communication channel between the satellite and the endpoint; and communicating data on a data plane over a broadband communication channel between the satellite and the endpoint.

8. The method of claim 7, wherein communicating the beacon on the control plane over the narrowband communication channel comprises broadcasting the beacon at a frequency of the narrowband communication channel.

9. The method of claim 8, wherein the frequency is a first frequency, and communicating the beacon on the control plane further comprises broadcasting the beacon at a second frequency of the narrowband communication channel after broadcasting the beacon at the first frequency.

10. The method of claim 7, wherein the beacon comprises an image having a plurality of pixels, and each pixel of the plurality of pixels comprises information relating a join frequency to a geographical area corresponding to the pixel.

11. The method of claim 7, further comprising communicating a network join response on the control plane after communicating the network join request on the control plane.

12. The method of claim 7, further comprising, detecting a signal strength of the data on the data plane over the broadband communication channel reaching a signal threshold condition, and in response, communicating a handover control message on the control plane over the narrowband communication channel.

13. The method of claim 12, wherein the broadband communication channel is a first broadband communication channel, and the method further comprises communicating the data on the data plane over a second broadband communication channel in response to the handover control message.

14. The method of claim 12, wherein the satellite is a first satellite, and the method further comprises communicating handover execution messages over an inter-satellite link between the first satellite and a second satellite in response to the handover control message.

15. A device, comprising:

narrowband communication hardware configured to communicate on a control plane over a narrowband communication channel with a satellite;

broadband communication hardware configured to communicate on a data plane over a broadband communication channel with the satellite;

a processor; and a storage device comprising instructions operable by the processor to:

communicate a beacon on the control plane over the narrowband communication channel between the device and the satellite, communicate a network join request, based at least upon the beacon, on the control plane over the narrowband communication channel between the device and the satellite, and communicate data on the data plane over the broadband communication channel between the device and the satellite.

16. The device of claim 15, wherein the device comprises one or more of a phone, a tablet, or a laptop.

17. The device of claim 15, wherein the device is configured to be incorporated into a vehicle.

18. The device of claim 15, wherein the instructions further are operable to detect a signal strength of the data on the data plane over the broadband communication channel reaching a signal threshold condition, and in response, communicate a handover control message on the control plane over the narrowband communication channel.

19. The device of claim 18, wherein the broadband communication channel is a first broadband communication channel, and the instructions are further operable to communicate the data on the data plane over a second broadband communication channel with the satellite in response to the handover control message.

* * * * *